Figure 1:
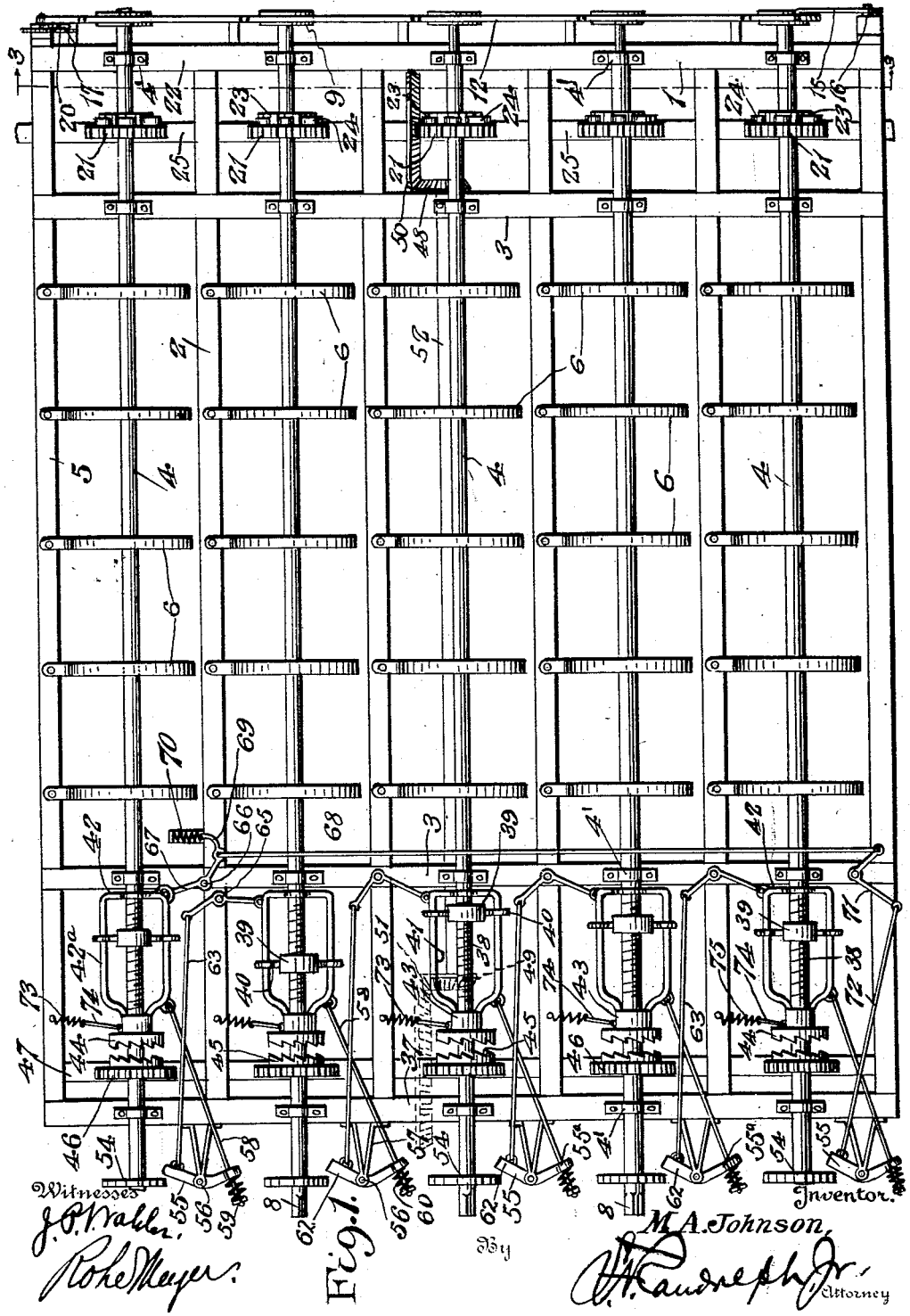

M. A. JOHNSON.
SPRING MOTOR.
APPLICATION FILED DEC. 29, 1914.

1,144,205.

Patented June 22, 1915.
3 SHEETS—SHEET 1.

Witnesses
Inventor
M. A. Johnson

M. A. JOHNSON.
SPRING MOTOR.
APPLICATION FILED DEC. 29, 1914.
1,144,205.
Patented June 22, 1915.
3 SHEETS—SHEET 2.
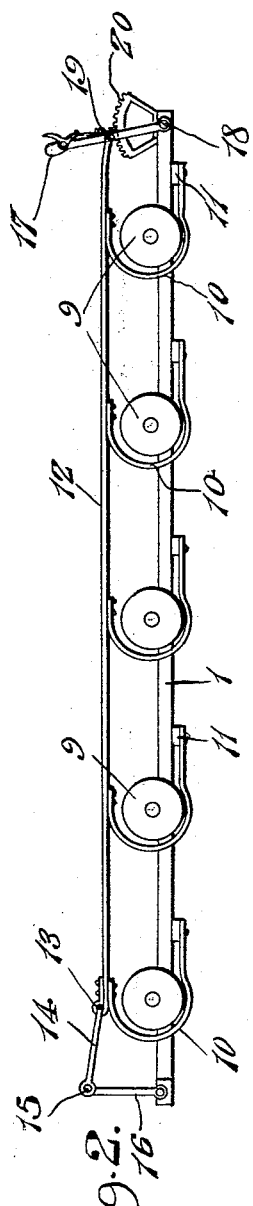
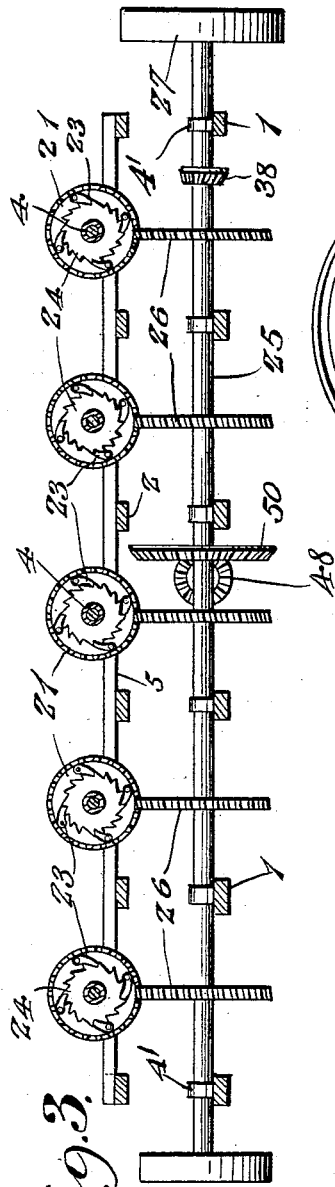
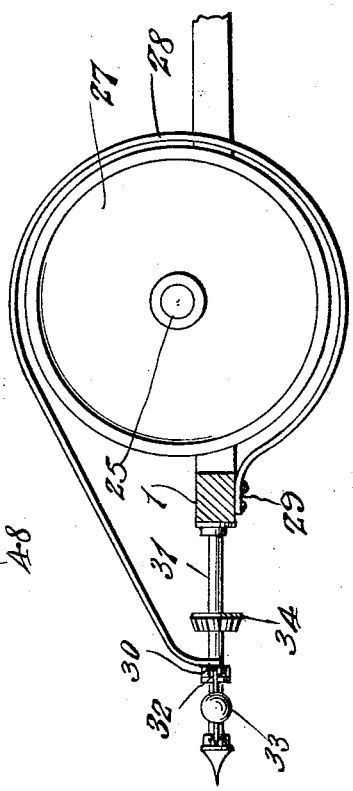
Witnesses
Inventor
M. A. Johnson.
By
Attorney

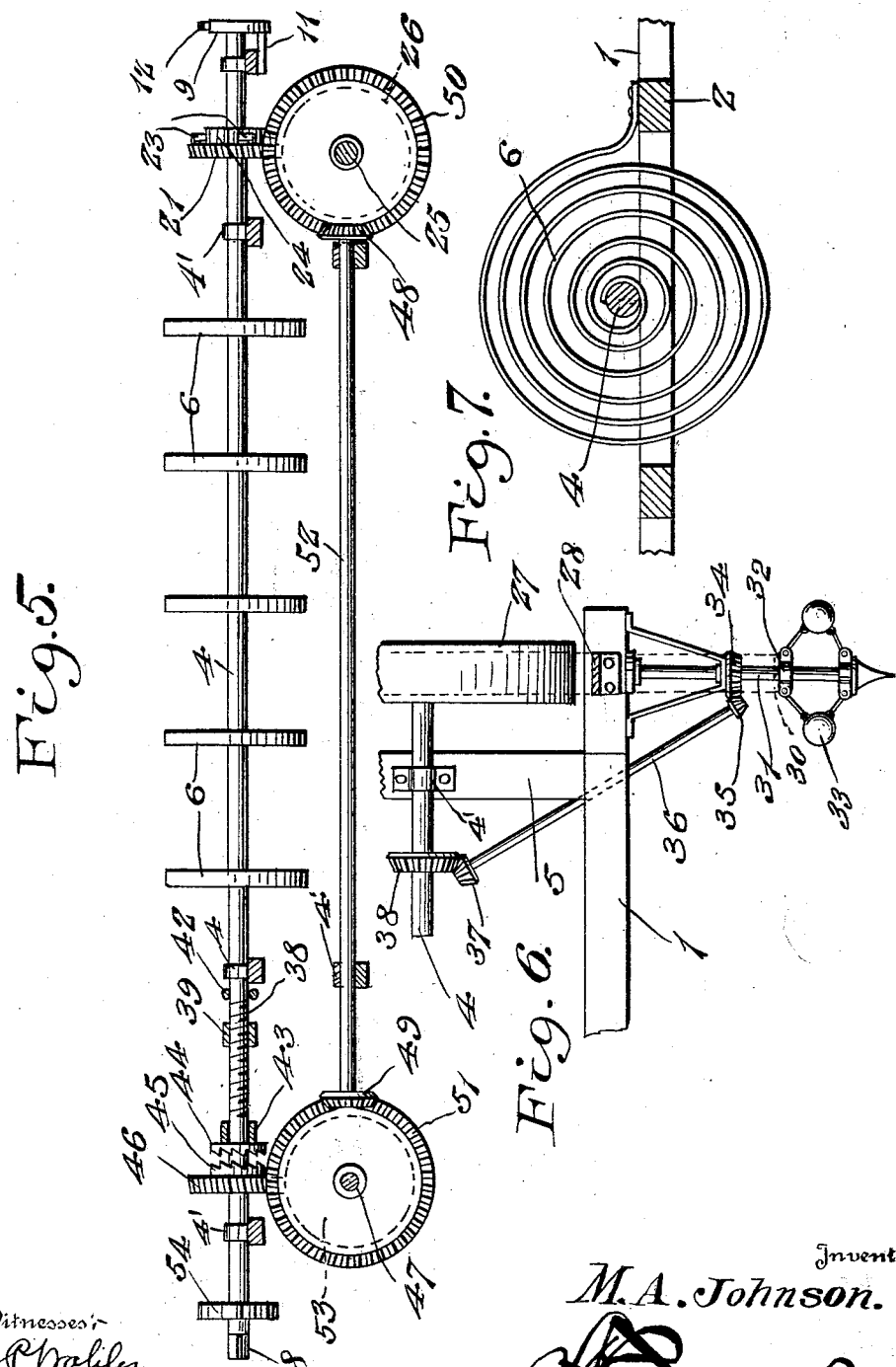

UNITED STATES PATENT OFFICE.

MARTIN A. JOHNSON, OF GALESVILLE, WISCONSIN.

SPRING-MOTOR.

1,144,205. Specification of Letters Patent. Patented June 22, 1915.

Application filed December 29, 1914. Serial No. 879,555.

*To all whom it may concern:*

Be it known that I, MARTIN A. JOHNSON, a citizen of the United States, residing at Galesville, in the county of Trempealeau and State of Wisconsin, have invented certain new and useful Improvements in Spring-Motors; and I do hereby declare the following to be a full, clear, and exact description of the invention, such as will enable others skilled in the art to which it appertains to make and use the same.

This invention relates to spring motors, and the primary object of the invention is to provide a spring motor which embodies a plurality of shafts and coil springs carried thereby, which are connected in such a manner, that one set of the springs carried by one of the shafts will be re-wound by the unwinding of various other sets of springs.

Another object of this invention is to provide a mechanism which acts automatically for setting the re-winding mechanism on any one of the various shafts when the springs thereon become unwound.

A still further object of this invention is to provide a suitable governing mechanism for controlling the speed of rotation of the shaft, and also to provide friction band brakes for regulating the rotation of the spring carrying shaft.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved spring motor. Fig. 2 is an end view of the spring motor. Fig. 3 is a cross sectional view on the line 3—3 of Fig. 1. Fig. 4 is a fragmentary side view of the governing mechanism of the spring motor. Fig. 5 is a longitudinal sectional view through the motor. Fig. 6 is a side elevation of a fragment of a governing mechanism, and Fig. 7 is a view showing the manner of attaching the coil springs to the shafts and the supporting frame of the motor.

Referring more particularly to the drawings, 1 designates the supporting frame of the spring motor which is substantially rectangular in shape and has a plurality of longitudinally extending cross bars 2 secured thereto, and a plurality of laterally extending cross bars 3 secured thereto adjacent its end. The frame 1 has journal brackets 4' secured to the upper surface of its ends and the cross bars 3 in which are rotatably journaled shafts 4. The shafts 4 are positioned intermediate of the longitudinally extending cross bars 2 and the side rails 5 of the frame 1 as is clearly shown by reference to Fig. 1 of the drawings.

The shafts 4 have one end of coil springs 6 secured thereto as is clearly shown in Fig. 7 of the drawings. The springs 6 are coiled about the shafts 4 and they have their ends secured to the longitudinally extending cross bars 2 as is shown in Fig. 7, so that the springs may be wound upon the shafts for unwinding therefrom, which unwinding of the springs will rotate the shafts in a reverse direction to the rotation of the shafts occasioned by the winding of the springs.

Each of the shafts 4 has a plurality of the coil springs 6 secured thereto in spaced relation to each other along their length and they also have their outer extreme end 8 rectangular in shape to provide for the initial rotation of the shaft for winding of the coil springs thereupon.

The ends of the shafts 4 opposite to the ones which are rectangular in shape, have small friction wheels 9 mounted thereupon about which wheels are disposed friction bands 10. The friction bands 10 have one of their ends secured to suitable cross pieces 11, and the other ends, secured to a band or flexible member 12 which extends entirely across the frame 1 of the motor and is swivelly connected as is shown at 13 to an arm 14. The arm 14 as in turn pivotally connected at 15 to a bar 16 which is supported by the frame 1. The flexible strap 12 has its free end connected to a hand lever 17 which is pivotally supported at 18 by the frame 1 and which has an ordinary type of dog mechanism 19 associated therewith for coaction with a quadrant 20, for holding the friction bands 10 in frictional engagement with the peripheries of the friction wheels 9 for forming a brake to prevent rotation of the shaft 4.

The shafts 4 have worms 21 mounted thereon intermediate of one of the cross pieces 3 and the ends 22 of the frame, which worms are keyed to the shafts and have ratchet wheels 24 formed on one side thereof. The worm gears 21 have pawls 23 carried thereby which coact with the ratchet teeth formed upon the ratchets 23, the purpose of which will be hereinafter more fully described. Positioned beneath the shafts 4 and extending transversely therefrom is a shaft 25, which has a plurality of worm gears 26 mounted thereupon, which mesh with the worms 21 carried by the shafts 4.

The shaft 25 extends beyond the sides of the frame 1 and it has a balancing fly wheel 27 mounted thereupon, which fly wheel has a friction surface upon its periphery, which is adapted for frictional engagement with a friction brake band 28. The brake band 28 is secured as at 29 to the frame 1 and extends about the periphery of the fly wheel 27, and has its free end connected to a collar 30 which is carried by a shaft 31. The collar 30 is slidably mounted upon the shaft 31 and is connected to a collar 32 in any suitable manner. The collar 32 forms a part of a ball governor mechanism 33, so that upon rotation of the various shafts 4, and the spreading of the ball governor 33, the collar 30 will be moved upwardly upon the shaft 32 and draw the brake band 28 into frictional binding engagement with the periphery of the fly wheel 27 for retarding the speed of rotation of the shaft.

The shaft 31 has a bevel gear 34 mounted thereon, which bevel gear meshes with a bevel pinion 35. The pinion 35 is mounted on a shaft 36, which extends downwardly diagonally from the shaft 31 and which has a second bevel pinion 37 mounted upon its lower end. The bevel pinion 37 meshes with a bevel gear 38 mounted upon one of the shafts 4, so that the shafts 31 and the governor mechanism 38 will be rotated by the rotation of the shafts 4 for properly regulating the speed of rotation of the shaft as heretofore described.

The shafts 4 have external screw threads formed along a fragment of their length, and between one of the lateral cross bars 3 and the end 37 of the frame 1 which is opposite to the end 22 thereof. The externally screw threaded section 38 of the shafts 4 have traveling nuts 39 mounted thereupon, which have radially extending fingers 40 extending from the peripheries thereof. The fingers 40 engage the side arms 41 of a frame 42, which is slidably mounted upon the shafts 4 and which frames have collars 43 formed upon their forward ends. The collars 43 have clutch segments 44 formed integrally therewith, which are adapted for coaction with clutch segments 45 which are formed upon worms 46.

The worms 46 are mounted upon the shafts 4 for independent rotation thereon, and they mesh with worm gears which are carried by a shaft 47. The shaft 47 is positioned parallel with the shaft 25, and at the opposite end of the frame 1, from the shaft 25. The shaft 47 is geared for synchronous rotation with the shaft 25, by bevel pinions 48 and 49, which mesh with bevel gears 50 and 51. The bevel gears 50 and 51 are of greater diameter than the gears 48 and 49 and are mounted upon the shafts 25 and 47 respectively. The bevel pinions 48 and 49 are mounted upon an auxiliary shaft 52, which is supported in any suitable manner beneath the frame 1 and extends along the length thereof, for imparting the rotation of the shaft 25 to the shaft 47, which rotation is in turn imparted to the worms 46 through worm gears 53 which are mounted upon the shaft 47.

The shafts 4 have ratchet wheels 54 mounted upon their outer ends, a short distance inwardly from the rectangular sections 8 thereof. The ratchet wheels 54 are engaged by pivoted levers 55, which levers are pivotally mounted as at 56 upon brackets 57, which are supported by the ends 37 of the frame 1.

The pivoted levers 55 have rods 58 connected to one end thereof, and extending therethrough. The rods 58 have enlarged heads 59 formed upon the ends which extend through one end of the levers 55, and cushioning coil springs 60 are mounted between the heads 59 and the ends of the levers 55 as is clearly shown in Fig. 1 of the drawings. The rods 58 are in turn pivotally connected to the frames 42, so that upon the sliding movement of the frame outwardly the rods 58 will be forced outwardly through the lever 55. Upon the inward sliding movement of the frames 42, the rod 58 will be moved inwardly, which will rock the lever 55 and force the ratchet engaging ends 62 of the levers 55 into engagement with the ratchets 54, for preventing rotation of the shafts 4 upon which the respective ratchet wheel is mounted.

The operative or ratchet wheel engaging end 62 of the levers 55 have rods 63 pivotally connected thereto, which rods extend rearwardly along the frame 1 and are connected to levers 64. The levers 64 are pivotally supported at 65 upon the longitudinal cross rails or bars 2 and are also connected to the frame 42 mounted upon the shaft next to the shaft upon which the respective ratchet wheels 54 are mounted, through which the levers 55 coact, as is clearly shown in Fig. 1 of the drawings.

The frame 42ª which is mounted upon the shaft 4 adjacent one side edge of the frame 1 has an arm 67 connected to the rear inner corner thereof, which lever is pivoted at 66 to the cross bar 3, and has a rod 68 connected to its free end. The rod 68 has its end bent angularly as is shown at 69 and abutting a cushioning spiral spring 70. The rod 68 extends transversely across the frame 1 and is connected to a bell crank arm 71, which arm is in turn connected to a rod 72. The rod 72 is secured to the lever 55 which is carried by the frame 1 upon the side opposite to the frame 42ª, so as to operate the lever 55ª by the movement of the frame 42ª.

The collars 43 have rods 74 pivotally connected thereto, which rods are in turn connected to spiral springs 73. The spiral springs 73 are carried by the cross pieces 2 of the frame 1, and they together with the rods 74 tend to hold the clutch segments 44 into engagement with the clutch segments 45, when the former are moved outwardly upon the shaft 4.

In the operation of the improved motor heretofore described: the springs 6 are initially wound by the rotation of the shafts 4 in any suitable manner by applying a handle or analogous device to the rectangular ends 8 thereof, and after the springs have been wound, four of them are employed for rewinding the fifth, in cases wherein five shafts and five separate springs are employed as is shown in the drawings.

During the unwinding of the spring, the shafts 4 will be rotated in one direction, which will feed the nuts 39 outwardly along the shafts and cause them to engage the collars 43, at approximately the time when the springs are completely unwound. The nuts 39 engaging the collars 43 will upon further rotation of the shafts force them outwardly causing the clutch segments 44 to move into engagement with the clutch segments 45, and consequently rotating the shafts 4 in a reverse direction to the direction of rotation during the unwinding of the spring, and cause the same to rotate in a winding direction for the springs and wind them about the shafts. When the frames 42 are moved outwardly by the nuts 39, the rods 58 are operated for causing the levers 55 to move into engagement with the ratchets 54 and prevent the unwinding of the springs during the rotation thereof.

The springs are wound and the shaft rotated in a winding direction of the springs by the shafts 25 and 47, which shafts are in turn rotated by certain of the shafts 4 through the intermeshing engagement of the worms 21 and the worm gears 26 carried by the shaft 25. During the winding of the springs, the nuts 39 will travel rearwardly along the shafts 4 and when they reach the rear end of the frames 42, will move these frames longitudinally along the shafts, moving the clutch segment 44 out of engagement with the clutch segment 45, and releasing the ratchet wheels 54 from engagement by the levers 55, which leaves the shafts 4 which has been recently rotated in the winding direction free for unwinding rotation of the springs. The winding shaft 47 is geared for rotation at an increased rate of speed so that the winding of the springs may be accomplished in a much less length of time than is necessary for the unwinding thereof.

From the foregoing description taken in connection with the accompanying drawings the advantages of construction and of the method of operation of the improved spring motor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a spring motor, a supporting frame, a plurality of shafts journaled longitudinally upon the frame, a plurality of coiled springs carried by each of said shafts, a shaft journaled transversely of said first named shaft and rotatable by said first named shaft, a second shaft journaled transversely of said first named shaft and in spaced relation to said first named transversely extending shaft, means for rotating said second named transversely extending shaft by the rotation of said first named transversely extending shaft and in a reverse direction thereto, means connecting said second named transversely extending shaft and said longitudinally rotated shaft whereby one of said longitudinally extending shafts will be rotated for winding the springs carried thereby, during the unwinding of the springs carried by the remainder of said shafts.

2. In a spring motor, a supporting frame, a plurality of shafts journaled longitudinally upon the frame, a plurality of coiled springs carried by each of said shafts, a shaft journaled transversely of said first named shaft and rotatable by said first named shaft, a second named shaft journaled transversely of said first named shaft and in spaced relation to said first named transversely extending shaft, means for rotating said second named transversely extending shaft by the rotation of said first named transversely extending shaft and in a reverse direction thereto, means connecting said second named transversely extending shaft and said longitudinally extending shafts will be rotated for winding the springs carried thereby, during the unwinding of the springs carried by the remainder of said shafts, a governor mechanism associated with said spring motor for regulating the speed of rotation of said shaft.

3. In a spring motor, a supporting frame, a plurality of shafts journaled longitudinally upon the frame, a plurality of coiled springs carried by each of said shafts, a shaft journaled transversely of said first named shaft and rotatable by said first named shaft, a second named shaft journaled transversely of said first named shaft and in spaced relation to said first named transversely extending shaft, means for rotating said second named transversely extending shaft by the rotation of said first named transversely extending shaft and in a reverse direction thereto, means connecting said second named transversely extending shaft and said longitudinally extending shafts will be rotated for winding the springs carried thereby, during the unwinding of the springs carried by the remainder of said shafts, a governor mechanism associated with said spring motor for regulating the speed of rotation of said shaft, friction wheels carried by the ends of said longitudinally extending shafts, friction bands mounted about said shafts and connected one to the other, a hand lever connected to said friction bands for moving them into or out of frictional engagement with said friction wheels for retarding the rotation of said shaft.

4. In a spring motor, a supporting frame, a plurality of shafts journaled longitudinally upon the frame, a plurality of coiled springs carried by each of said shafts, a shaft journaled transversely of said first named shaft and rotatable by said first named shaft, a second shaft journaled transversely of said first named shaft and in spaced relation to said first named transversely extending shaft, means for rotating said second named transversely extending shaft by the rotation of said first named transversely extending shaft and in a reverse direction thereto, means for connecting said second named transversely extending shaft and said longitudinally rotated shaft whereby one of said longitudinally extending shafts will be rotated for winding the springs carried thereby during the unwinding of the springs carried by the remainder of said shafts, friction wheels carried by the ends of said longitudinally extending shafts, friction bands mounted about said shafts and connected one to the other, a hand lever connected to said friction bands for moving them into or out of frictional engagement with said friction wheels for retarding the rotation of said shaft.

5. In a spring motor, a supporting frame, a plurality of shafts journaled longitudinally of said frame, a plurality of coiled springs carried by each of said shafts, a shaft journaled transversely of said first named shaft and positioned therebeneath, worm gears connecting said longitudinal and said transverse shaft for rotating said transverse shaft by the rotation of said longitudinal shaft, a second transversely extending shaft operatively connected to said first named transversely extending shaft, worm gears loosely mounted upon said longitudinally extending shaft, worm gears rigidly mounted upon said second named transversely extending shaft and meshing with the worm gears formed upon said longitudinally extending shaft, clutch segments slidably mounted upon said longitudinally extending shaft, and means for automatically moving said slidable clutch segments into engagement with said worm geared carried clutch segment upon the unwinding of the spring connected to the longitudinal shaft, said clutch segments rotating the longitudinal shafts in a winding direction when they are in engagement with each other.

6. In a spring motor, a supporting frame, a plurality of shafts journaled longitudinally of said frame, a plurality of coiled springs carried by each of said shafts, a shaft journaled transversely of said first named shaft and positioned therebeneath, worm gears connecting said longitudinal and said transverse shaft for rotating said transverse shaft by the rotation of said longitudinal shaft, a second transversely extending shaft operatively connected to said first named transversely extending shaft, worm gears loosely mounted upon said longitudinally extending shaft, worm gears rigidly mounted upon said second named transversely extending shaft and meshing with the worm gears formed upon said longitudinally extending shaft, clutch segments slidably mounted upon said longitudinally extending shaft, and means for automatically moving said slidable clutch segments into engagement with said worm geared carried clutch segments upon the unwinding of the spring connected to the longitudinal shaft, said clutch segments rotating the longitudinal shafts in a winding direction when they are in engagement with each other and means for preventing the unwinding rotation of said shafts during the winding thereof.

7. In a spring motor, a supporting frame, a plurality of shafts journaled longitudinally of said frame, a plurality of coiled springs carried by each of said shafts, a shaft journaled transversely of said first named shaft and positioned therebeneath, worm gears connecting said longitudinal and said transverse shaft for rotating said transverse shaft by the rotation of said longitudinal shaft, a second transversely extending shaft operatively connected to said first named transversely extending shaft, worm gears loosely mounted upon said longitudinally extending shaft, worm gears rigidly mounted upon said second named transversely extending shaft and meshing with the worm gears formed upon said longitudinally extending shaft, clutch segments slidably mounted upon said longitudinally extending shaft, and means for automatically moving said slidable clutch segments into engagement with said worm geared carried clutch segments upon the unwinding of the spring connected to the longitudinal shaft, said clutch segments rotating the longitudinal shafts in a winding direction when they are in engagement with each other and means for preventing the unwinding rotation of said shafts during the winding thereof, a governor mechanism associated with said shaft and operatively connected thereto for controlling the speed of rotation of the shaft.

8. In a spring motor, a supporting frame, a plurality of shafts journaled longitudinally of said frame, a plurality of coiled springs carried by each of said shafts, a shaft journaled transversely of said first named shaft and positioned therebeneath, worm gears connecting said longitudinal and said transverse shaft for rotating said transverse shaft by the rotation of said longitudinal shaft, a second transversely extending shaft operatively connected to said first named transversely extending shaft, worm gears loosely mounted upon said longitudinally extending shaft, worm gears rigidly mounted upon said second named transversely extending shaft and meshing with the worm gears formed upon said longitudinally extending shaft, clutch segments slidably mounted upon said longitudinally extending shaft, and means for automatically moving said slidable clutch segments into engagement with said worm geared carried clutch segments upon the unwinding of the spring connected to the longitudinal shaft, said clutch segments rotating the longitudinal shafts in a winding direction when they are in engagement with each other and means for preventing the unwinding rotation of said shafts during the winding thereof, a governor mechanism associated with said shaft and operatively connected thereto for controlling the speed of rotation of the shaft, a plurality of friction wheels mounted upon the terminal ends of said shafts, friction bands mounted about said friction wheels, a band connecting all of said bands, a hand lever connected to said second named band for moving said friction band synchronously into engagement with said friction wheel for retarding rotation of said shaft.

In testimony whereof I affix my signature in presence of two witnesses.

MARTIN A. JOHNSON.

Witnesses:
ALBERT T. TWESME,
OSCAR OLSON.

Copies of this patent may be obtained for five cents each, by addressing the "Commissioner of Patents, Washington, D. C."